(12) United States Patent  
Divekar et al.

(10) Patent No.: US 9,292,269 B2
(45) Date of Patent: Mar. 22, 2016

(54) CONTROL FLOW OPTIMIZATION FOR EFFICIENT PROGRAM CODE EXECUTION ON A PROCESSOR

(71) Applicant: NVIDIA Corporation, Santa Clara, CA (US)

(72) Inventors: Shekhar Vasant Divekar, Maharashtra (IN); Balajikrishna Atukuri, Maharashtra (IN); Boris Beylin, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 108 days.

(21) Appl. No.: 14/169,264

(22) Filed: Jan. 31, 2014

(65) Prior Publication Data

US 2015/0220314 A1  Aug. 6, 2015

(51) Int. Cl.
G06F 9/45 (2006.01)

(52) U.S. Cl.
CPC ............. *G06F 8/458* (2013.01); *G06F 8/445* (2013.01)

(58) Field of Classification Search
None
See application file for complete search history.

(56) References Cited

U.S. PATENT DOCUMENTS

| | | | | |
|---|---|---|---|---|
| 7,590,521 | B2 * | 9/2009 | Ma ..................... | G06F 11/3676 703/1 |
| 7,861,226 | B1 * | 12/2010 | Episkopos ......... | G06F 11/3676 717/124 |
| 8,495,598 | B2 * | 7/2013 | Gounares ........... | G06F 9/44505 717/140 |
| 2011/0230978 | A1 * | 9/2011 | Jie ..................... | G06F 8/45 700/4 |
| 2011/0314337 | A1 * | 12/2011 | Sinha ................. | G06F 11/3624 714/37 |
| 2013/0297181 | A1 | 11/2013 | Wang et al. | |
| 2013/0305021 | A1 * | 11/2013 | Grover ............... | G06F 9/46 712/214 |
| 2013/0339936 | A1 * | 12/2013 | Boulos ............... | G06F 9/45508 717/153 |
| 2014/0215187 | A1 * | 7/2014 | Yazdani ............. | G06F 9/38 712/206 |
| 2014/0223420 | A1 * | 8/2014 | Kudlur ............... | G06F 8/45 717/156 |
| 2015/0143349 | A1 * | 5/2015 | Wang ................. | G06F 8/434 717/156 |
| 2015/0205590 | A1 * | 7/2015 | Sabne ................ | G06F 8/456 717/150 |
| 2015/0220314 | A1 * | 8/2015 | Divekar ............. | G06F 8/445 717/157 |

FOREIGN PATENT DOCUMENTS

EP  1912119 B1  5/2010

* cited by examiner

*Primary Examiner* — Isaac T Tecklu
(74) *Attorney, Agent, or Firm* — Zilka-Kotab, PC

(57) ABSTRACT

A method includes identifying a divergent region of interest (DRI) not including a post dominator node thereof within a control flow graph, and introducing a decision node in the control flow graph such that the decision node post-dominates an entry point of the DRI and is dominated by the entry point. The method also includes redirecting a regular control flow path within the control flow graph from another node previously coupled to the DRI to the decision node, and redirecting a runaway path from the another node to the decision node. Further, the method includes marking the runaway path to differentiate the runaway path from the regular control flow path, and directing control flow from the decision node to an originally intended destination of each of the regular control flow path and the runaway path based on the marking to provide for program thread synchronization and optimization within the DRI.

8 Claims, 9 Drawing Sheets

MULTIPLE NESTED
LOOP 600

CONTROL FLOW OPTIMIZATION FOR EFFICIENT PROGRAM CODE EXECUTION ON A PROCESSOR

FIELD OF TECHNOLOGY

This disclosure relates generally to control flow graphs and, more particularly, to a method, a device and/or a system of control flow graph optimization for efficient program code execution on a processor.

BACKGROUND

A control flow graph may be a data structure abstracting control flow behavior of executable program code. Nodes of the control flow graph may be basic blocks thereof and edges/paths may represent prospective transfer of control flow from one node to another. For example, the program code may be executed on parallel hardware architecture (e.g., NVIDIA®'s Compute Unified Device Architecture (CUDA®)) including a processor, where performance may be determined by the parallelism involved in executing a number of program threads simultaneously thereon. For maximum efficiency, all program threads may have to execute the same program code.

However, one or more nodes of the control flow graph may have divergent conditions associated therewith. In other words, the aforementioned one or more nodes may abstract creation of separate program threads that may compromise on the parallelism offered during execution of the program code on the processor.

SUMMARY

Disclosed are a method, a device and/or a system of control flow graph optimization for efficient program code execution on a processor.

In one aspect, a method includes identifying, based on execution of instructions through a processor communicatively coupled to a memory, a divergent region of interest (DRI) within a control flow graph. The control flow graph is a data structure abstracting control flow behavior of executable program code. The DRI is a region within the control flow graph not including a post-dominator node associated therewith. The DRI, when optimized, provides for reduced runtime of the executable program code compared to the DRI unoptimized. The method also includes introducing, through the execution of the instructions, a decision node in the control flow graph such that the decision node post-dominates an entry point of the DRI and is dominated by the entry point, and redirecting, through the execution of the instructions, a regular control flow path within the control flow graph from another node previously coupled to the DRI to the decision node.

Further, the method includes redirecting, through the execution of the instructions, a runaway path from the another node to the decision node. The runaway path is a control flow path that previously diverged away from the DRI instead of being coupled thereto. Still further, the method includes marking, through the execution of the instructions, the runaway path to differentiate the runaway path from the regular control flow path following the redirection of the regular control flow path and the runaway path to the decision node, and directing, through the execution of the instructions, control flow from the decision node to an originally intended destination of each of the regular control flow path and the runaway path based on the marking to provide for program thread synchronization and optimization within the DRI.

In another aspect, a non-transitory medium, readable through a processor and including instructions embodied therein that are executable through the processor, is disclosed. The non-transitory medium includes instructions to identify a DRI within a control flow graph. The control flow graph is a data structure abstracting control flow behavior of executable program code, and the DRI is a region within the control flow graph not including a post-dominator node associated therewith. The DRI, when optimized, provides for reduced runtime of the executable program code compared to the DRI unoptimized. The non-transitory medium also includes instructions to introduce a decision node in the control flow graph such that the decision node post-dominates an entry point of the DRI and is dominated by the entry point, and instructions to redirect a regular control flow path within the control flow graph from another node previously coupled to the DRI to the decision node.

Further, the non-transitory medium includes instructions to redirect a runaway path from the another node to the decision node. The runaway path is a control flow path that previously diverged away from the DRI instead of being coupled thereto. Still further, the non-transitory medium includes instructions to mark the runaway path to differentiate the runaway path from the regular control flow path following the redirection of the regular control flow path and the runaway path to the decision node, and instructions to direct control flow from the decision node to an originally intended destination of each of the regular control flow path and the runaway path based on the marking to provide for program thread synchronization and optimization within the DRI.

In yet another aspect, a method includes redirecting, based on execution of instructions through a processor communicatively coupled to a memory, a regular control flow path out of a loop within a control flow graph and a runaway path away from the loop to a newly created decision node. The control flow graph is a data structure abstracting control flow behavior of executable program code. The method also includes distinctly marking, through the execution of the instructions, the regular control flow path and the runaway path to enable differentiation therebetween, and implementing, through the execution of the instructions, the newly created decision node such that control flow from the regular control flow path and control flow from the runaway path are directed to originally intended destinations thereof based on the distinct marking to enable optimization of the loop within the control flow graph.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of control flow graph optimization for efficient program code execution on a processor. Although the present embodiments have been described with reference to specific example embodiments, it will be evident that various modifications and changes may be made to these embodiments without departing from the broader spirit and scope of the various embodiments.

Figure 1:
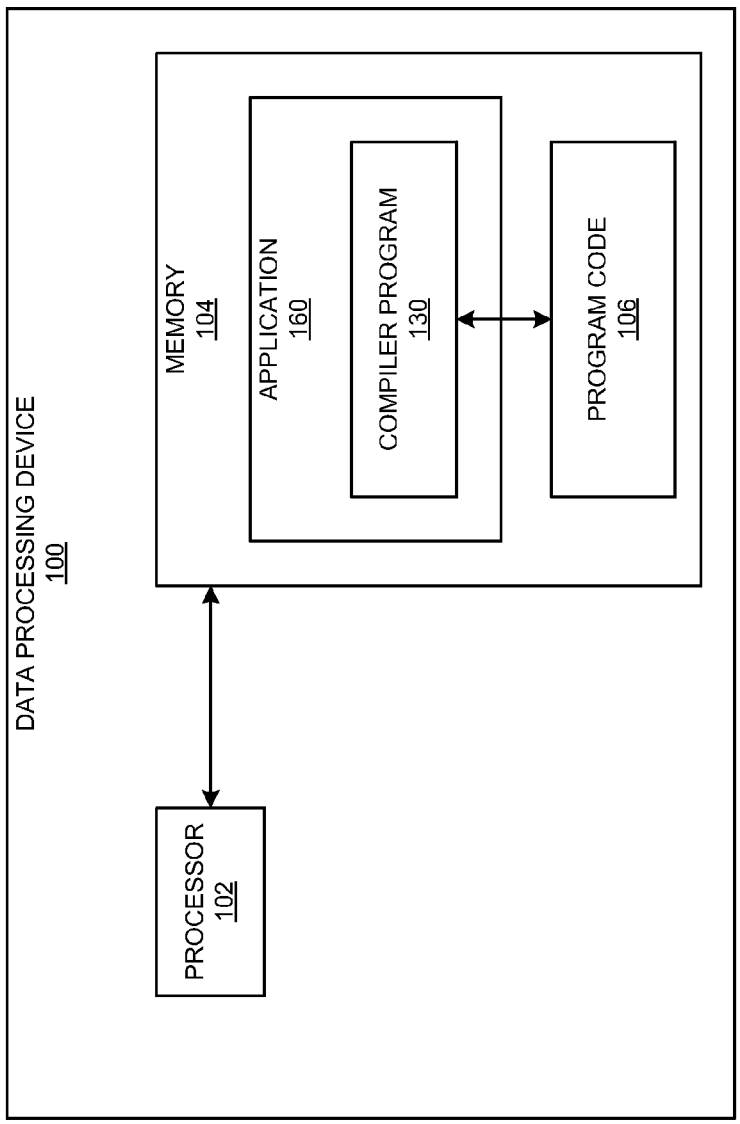
FIG. 1 is a schematic view of a data processing device, according to one or more embodiments.

FIG. 1 shows a data processing device 100, according to one or more embodiments. In one or more embodiments, data processing device 100 may include a processor 102 (e.g., a Central Processing Unit (CPU), a Graphics Processing Unit (GPU) and/or another processor such as a microcontroller and a microprocessor) communicatively coupled to a memory 104 (e.g., a volatile memory and/or a non-volatile memory); processor 102 may be configured to address storage locations in memory 104. Data processing device 100 may, for example, be a desktop computer, a laptop computer, a notebook computer, a netbook or a mobile device such as a mobile phone and a tablet. Other forms of data processing device 100 are within the scope of the exemplary embodiments discussed herein.

In one or more embodiments, processor 102 may execute a compiler program 130 thereon; FIG. 1 shows compiler program 130 as being stored in memory 104. Compiler program 130 is well known to one of ordinary skill in the art as a program or a set of instructions/programs to convert instructions in a high-level programming language (e.g., a human-readable programming language) to a lower-level language (e.g., machine language). Exemplary embodiments discussed herein may preferably be implemented in compiler program 130 as part of optimization provided therein. It should be noted that compiler program 130 may be part of a software tool (e.g., an application) executing on data processing device 100. FIG. 1 shows an application 160 (example software tool) including compiler program 130 as executing on data processing device 100; again, application 160 is shown as being stored in memory 104.

Figure 2:
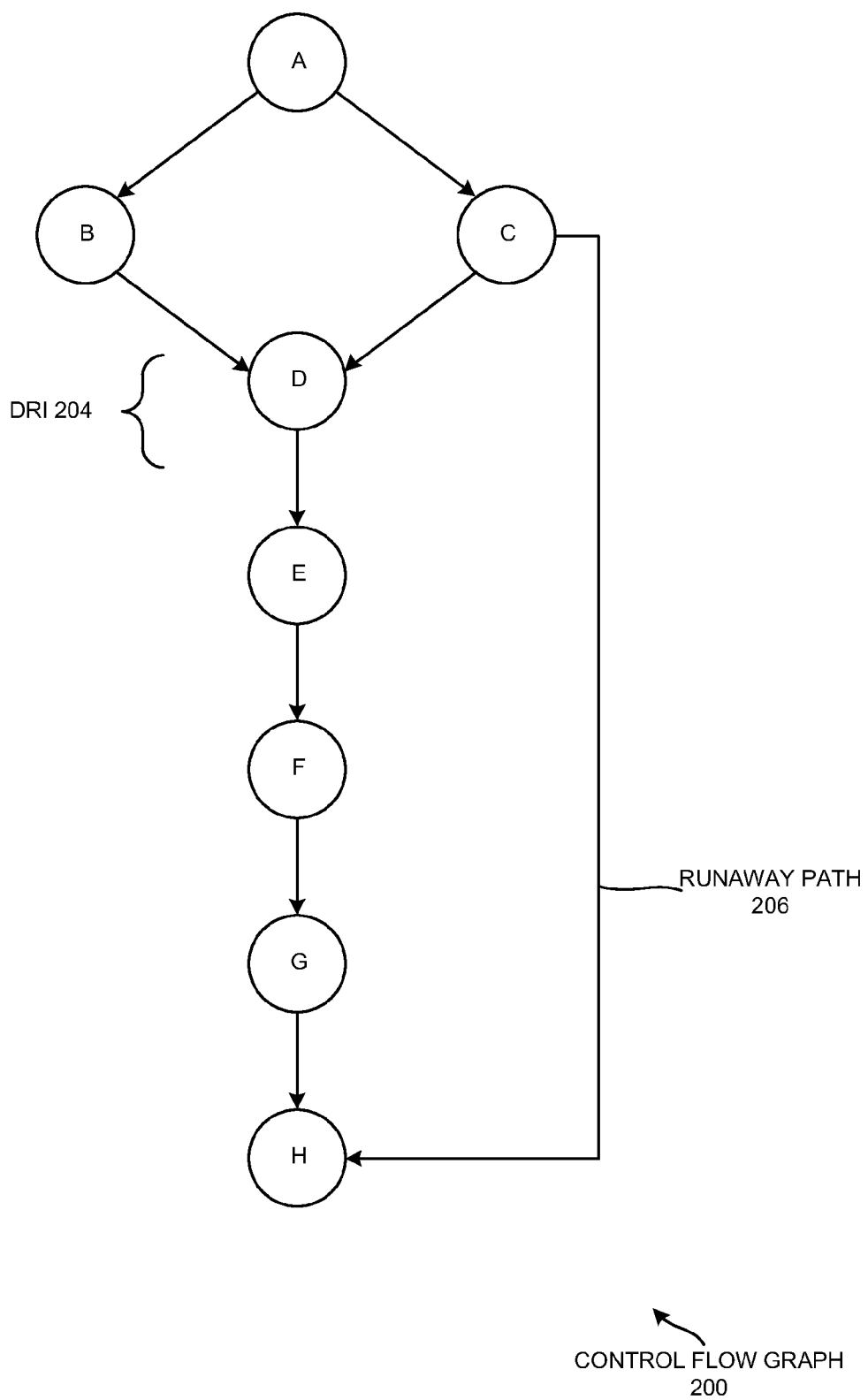
FIG. 2 is a schematic view of a control flow graph.

Data flow associated with a program executing on processor 102 may be represented through a control flow graph. FIG. 1 shows instructions associated with the program being stored in memory 104 as program code 106. Compiler program 130 may convert instructions of program code 106 to a machine language. The control flow graph may be a data structure abstracting control flow behavior of program code 106 when compiled. Nodes of the control flow graph may be basic blocks thereof and edges/paths may represent prospective transfer of control flow from one node to another. FIG. 2 shows an example control flow graph 200. Node A and node H may be the entry node and the exit node of control flow graph 200 respectively. The entry node may be understood as the node through which control enters into control flow graph 200 and the exit node may be understood as the node through which control flow leaves.

In FIG. 2, it is clear that nodes A and C have divergent conditions associated therewith. In other words, nodes A and C may abstract creation of separate program threads that may compromise on the parallelism offered during execution of program code 106 on processor 102. In one example embodiment, program code 106 may be executed on parallel hardware architecture (e.g., NVIDIA®'s Compute Unified Device Architecture (CUDA®)) including processor 102, where performance may be determined by the parallelism involved in executing a number of program threads simultaneously thereon. For maximum efficiency, all program threads may have to execute the same program code. However, as seen through control flow graph 200, execution of program code 106 may be divergent; the cause of the divergence may, for example, be an if-else conditional statement in program code 106.

Figure 3:
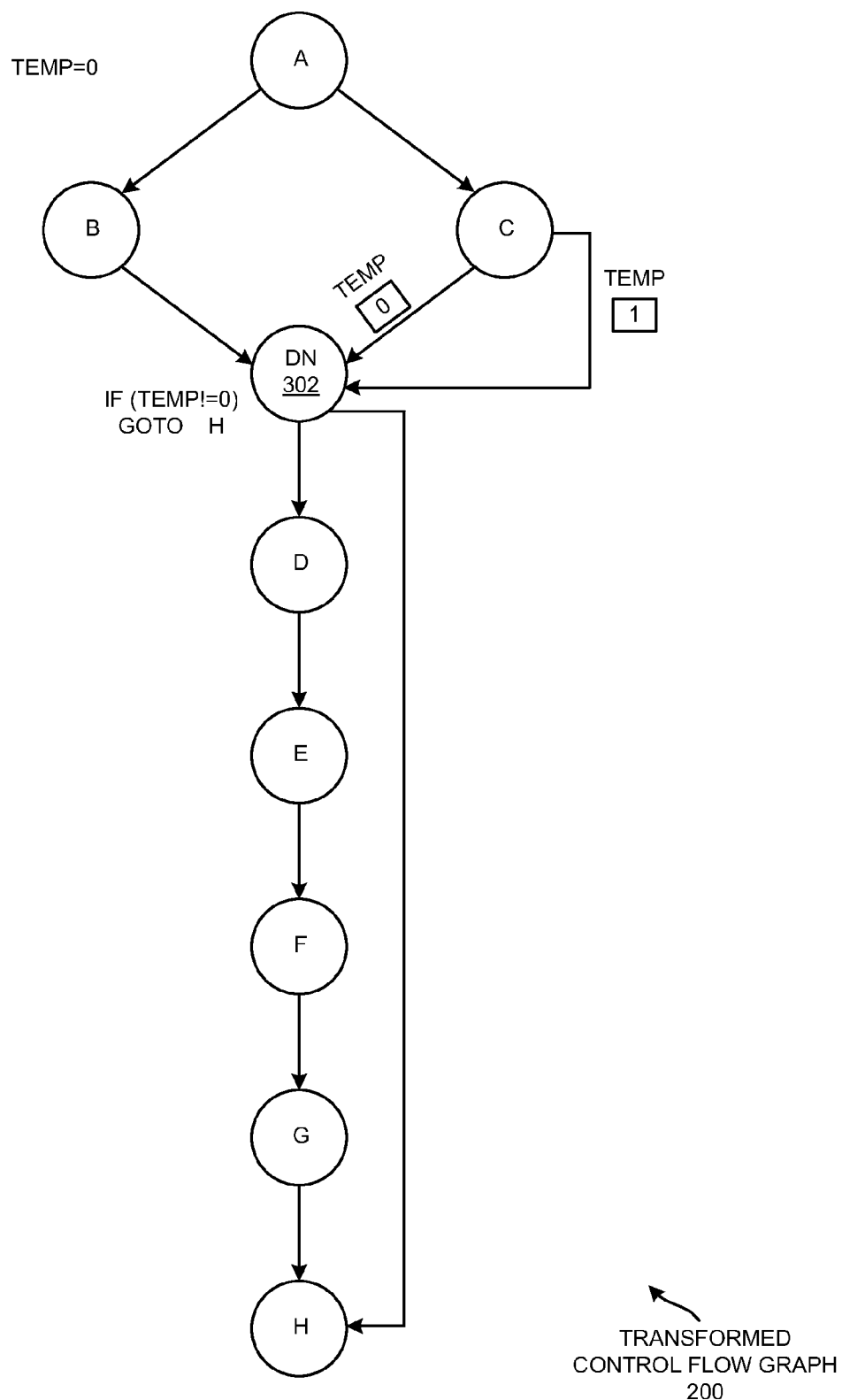
FIG. 3 is a schematic view of thread synchronization in the control flow graph of FIG. 2 through a control flow transformation, according to one or more embodiments.

In control flow graph 200, thread synchronization at node D may provide for thread convergence. Without synchronization, the control flow path during execution of program code 106 may, for example, be from A-B-D-E-F-G-H in one thread, A-C-D-E-F-G-H in another thread and A-C-H in yet another thread. Traditional edge-synchronization methods may only allow for synchronization at nodes A and H because of the control flow path (or, edge) C-H. FIG. 3 shows thread synchronization in control flow graph 200 through a control flow transformation, according to one or more embodiments. In one or more embodiments, nodes of control flow graph 200 may be analyzed to identify one or more divergent regions of interest (DRIs). A DRI may be defined as a region of interest within control flow graph 200 that does not have a post-dominator node thereof; also, the DRI may be associated with a part of program code 106, which, when synchronized, reduces runtime through thread convergence. In FIG. 2, a region including node D may be identified as the DRI (e.g., DRI 204).

In one or more embodiments, once DRI 204 is identified, a new decision node (DN) 302 may be introduced in control flow graph 200 such that DN 302 post-dominates the entry point of DRI 204 and is dominated by said entry point. FIG. 3 shows the exits of nodes B and C both being coupled to DN 302. In one or more embodiments, one or more exits of nodes preceding DRI 204 may be associated with control flow paths that diverge away from DRI 204; such control flow paths may be termed runaway paths (or, edges). In FIG. 2, the control flow path C-H may be the runaway path (e.g., runaway path 206) diverging from DRI 204. In one or more embodiments, in order for program code 106 to remain semantically correct, control flow graph 200 may be appropriately modified such that runaway path 206 is appropriately marked.

For example, a temporary variable (TEMP) may be initialized (e.g., to 0) at the pre-header (prior to node A) of control flow graph 200 or at the beginning of node C. As discussed above, the control flow path from node C to DN 302 representing runaway path 206 may be appropriately marked by modifying TEMP to another value (say, 1; see FIG. 3); the control flow path from node C to DN 302 representing the original control flow path from node C to node D may retain the initialized value of TEMP. Now DN 302 may be implemented (e.g., based on a conditional statement such as an IF-ELSE) such that control may pass to node D if TEMP retains the initialized value and to node H if TEMP equals the another value. Thus, redundant traversing of the D-H control flow path (and, vice versa) may be avoided.

In one or more embodiments, once the abovementioned transformation is performed, compiler program 130 compiling program code 106 may easily synchronize DRI 204. Thus, in one or more embodiments thread, divergence may be avoided by allowing non-divergent threads to resynchronize at an earlier point than that possible through synchronization techniques associated with the traditional methods.

In one or more embodiments, the optimal DRI (e.g., DRI 204) may be obtained through heuristics such as static analysis of program code 106 to determine dynamic instruction saving, profiling information (e.g., based on results of execution of distinct threads of program code 106) and overhead of extraneous instructions associated with program code 106. It should be noted that if the underlying architecture associated with processor 102 supports multi-way branches in control flow graph 200, then overhead associated with a conditional statement such as IF-ELSE may be minimal.

Figure 4:
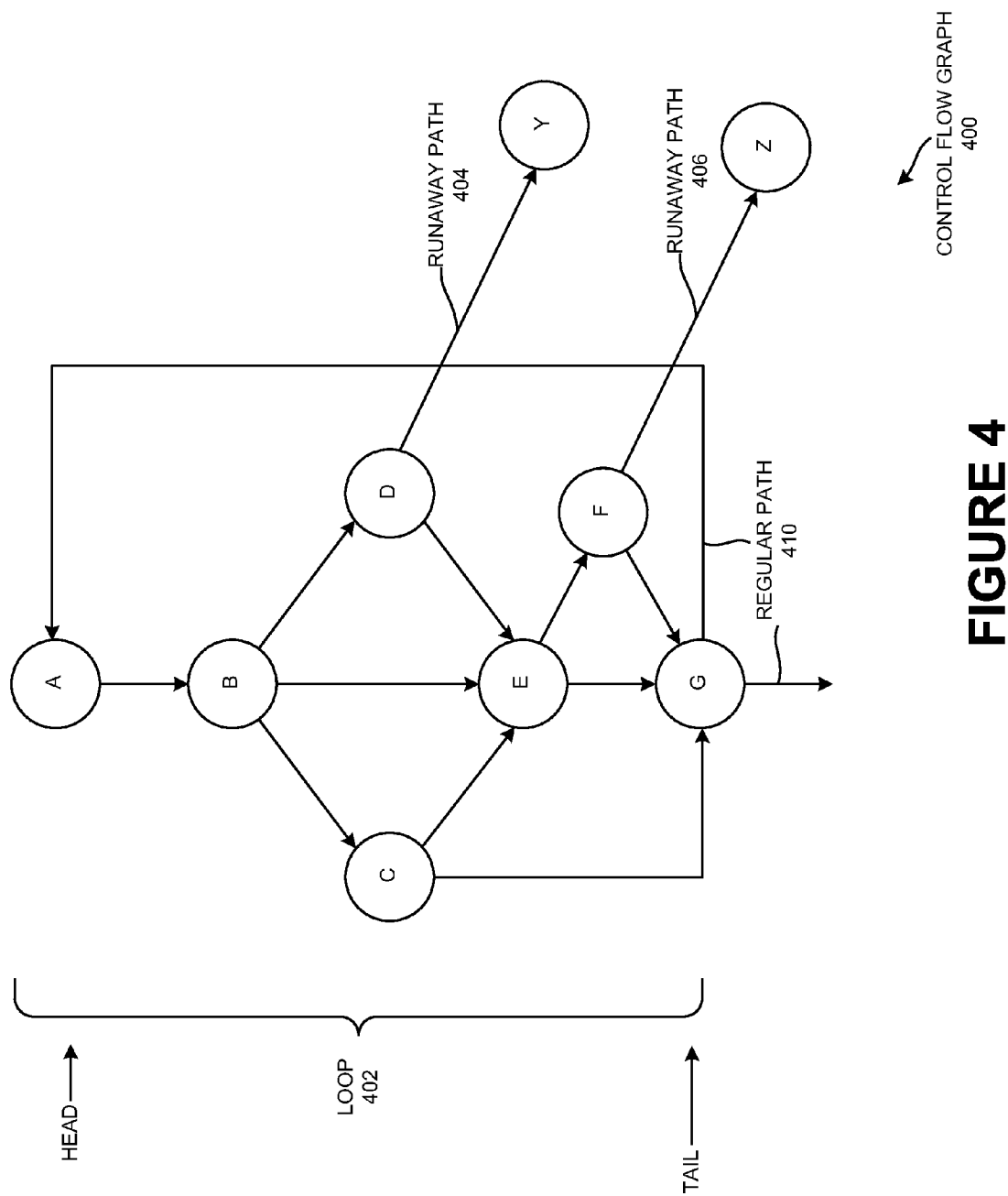
FIG. 4 is a schematic view of another control flow graph including a loop therein.

In one or more embodiments, program code 106 may also include a lot of loops with branches/edges going outside the loops. FIG. 4 shows an example control flow graph 400 including a loop 402 therein. There may exist a control flow path from any node of loop 402 to any other node thereof. However, as seen in FIG. 4, control flow graph 400 may include one or more branches/edges/control flow paths leaving loop 402. The aforementioned branches/edges/control flow paths may be termed runaway paths. FIG. 4 shows two runaway paths, viz. runaway path 404 and runaway path 406, leaving loop 402. It is obvious to see that there are no control flow paths from node G to node Z, node G to node Y, node Y to any other node, node Z to any other node et al.

Existing synchronization methods may require loop 402 to be well formed with a pre-header and a post-tail. Said a pre-header and a post-tail pair may have a dominator/post-dominator relationship therebetween. The pre-header may be defined as an immediate predecessor to the head node (entry node) of loop 402; similarly, the post-tail may be defined as the immediate successor to the tail node (exit node) of loop 402. Although loop 402 is well formed, it may not be possible to determine the pre-header and the post-tail thereof due to runaway path 404 and runaway path 406 exiting loop 402.

Figure 5:
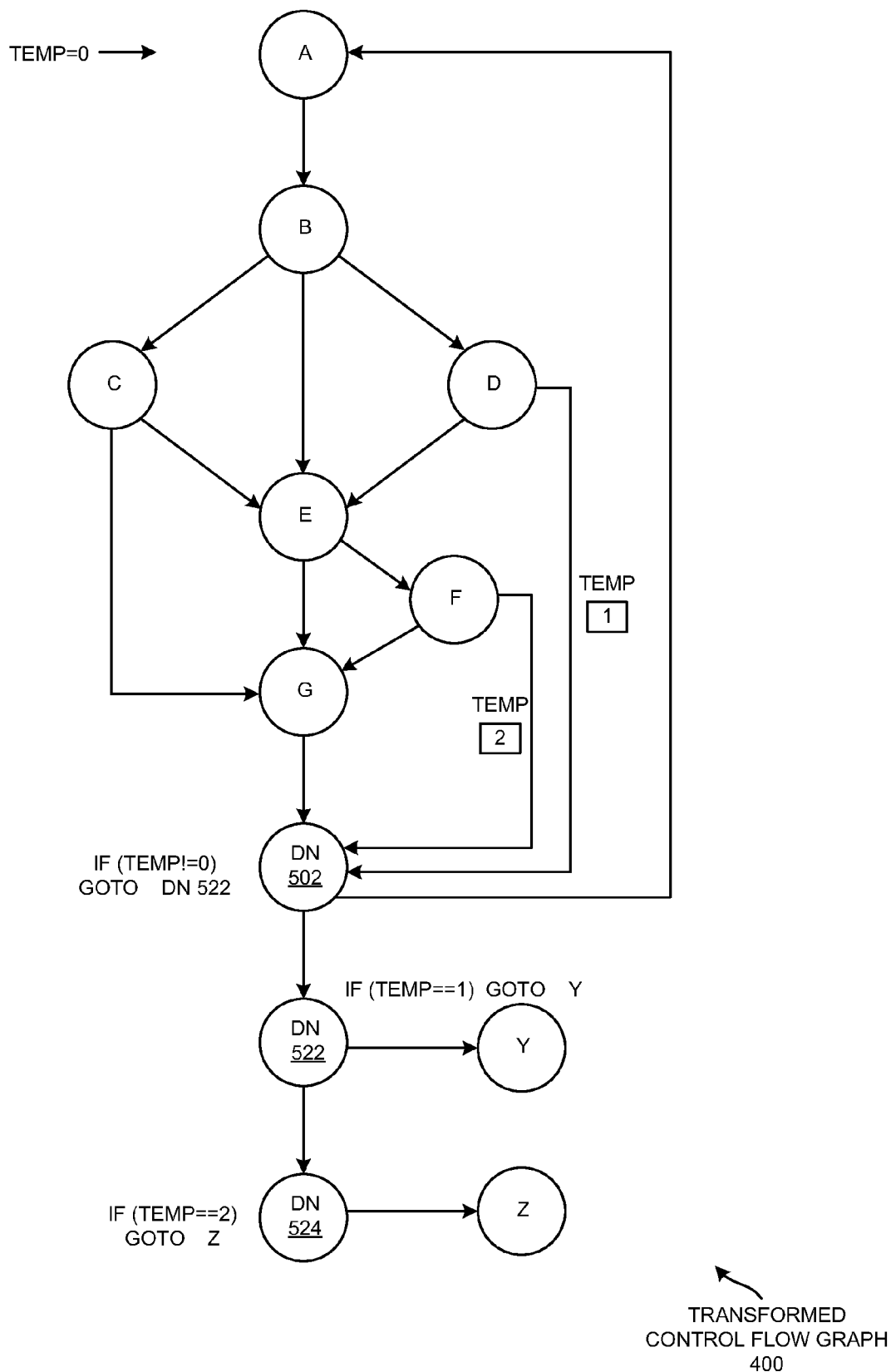
FIG. 5 is a schematic view of synchronization of the loop through a control flow transformation in the control flow graph of FIG. 4, according to one or more embodiments.

FIG. 5 shows synchronization of loop 402 through a control flow transformation in control flow graph 400, according to one or more embodiments. Analogous to the discussion with regard to FIGS. 2-3, control flow path D-Y and control flow path F-Z may be identified as runaway path 404 and runaway path 406 respectively. In one or more embodiments, in accordance with the transformation, all regular and runaway paths away from loop 402 may be redirected to a new DN 502. FIG. 5 shows runaway path 404 and runaway path 406 both being coupled to DN 502. Further, the regular path (e.g., regular path 410 in FIG. 4)/exit out of node G is also shown as being coupled to DN 502. In one or more embodiments, each of the runaway paths and the regular path may be distinctly marked to enable differentiation therebetween. For example, TEMP may be initialized (e.g., to 0) at the pre-header (prior to node A) or the pre-node (say, prior to node D) level. Thus, regular path 410 may be associated with the initialized value (e.g., 0) of TEMP, runaway path 404 may be associated with a modified value (e.g., 1) of TEMP and runaway path 406 may be associated with another modified value (e.g., 2) of TEMP.

DN 502 may then be implemented with conditional branches (e.g., DN 522 and DN 524) that direct control flow to the appropriate paths; FIG. 5 shows DN 502 being associated with DN 522, which, in turn, is associated with DN 524. In an example embodiment where the TEMP values for regular path 410, runaway path 404 and runaway path 406 are 0, 1 and 2 respectively, control may be passed outside node G (or, to node A, depending on whether loop 402 is completed) when TEMP is 0. When TEMP is not equal to 0, control may be passed to DN 522. Now, when TEMP is determined to be 1 at DN 522, control may be passed to node Y; else, control may be passed to DN 524 and, then, depending on whether TEMP is 2, to node Z.

To summarize, in one or more embodiments, all regular and runaway path exits may be collected at a decision node, following which TEMP may be tested to differentiate between a regular path and a runaway path. In one or more embodiments, if the original data path is a runaway path, additional tests may be performed to jump to the correct target node. In one or more embodiments, following the aforementioned control transformation, one or more loops (e.g., represented through the abstraction of loop 402) of program code 106 may be synchronized.

Figure 6:
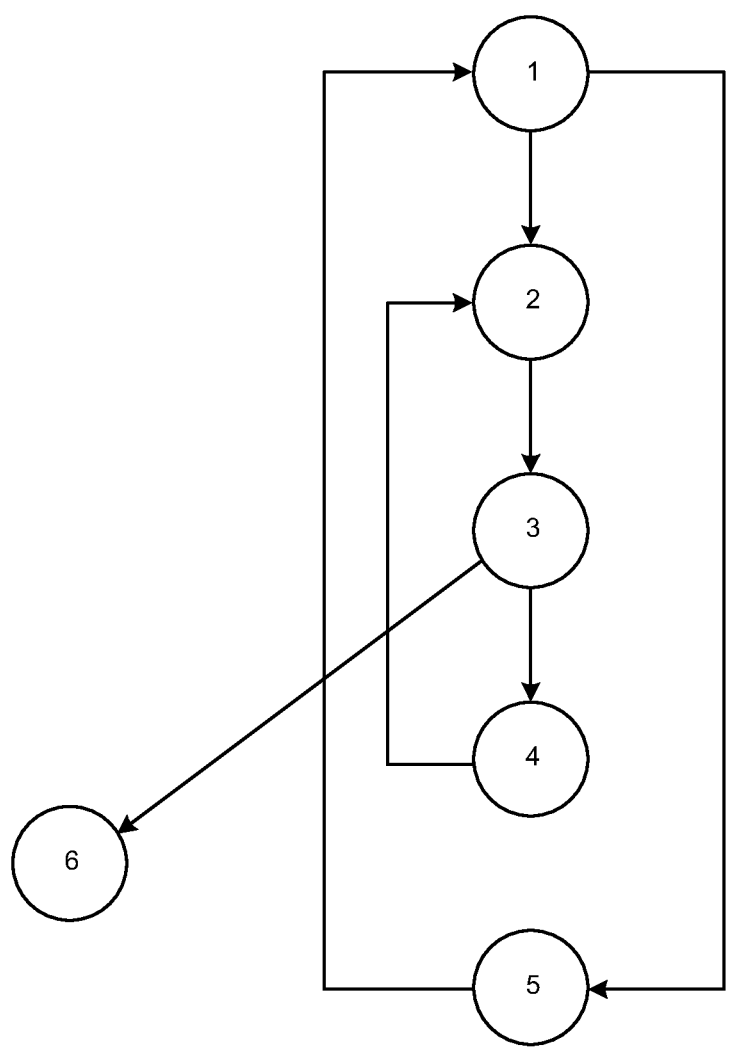
FIG. 6 is a schematic view of a multiple nested loop.

In one or more embodiments, in the case of a multiple nested loop within a control flow graph, the control flow transformation discussed above may be applied from an innermost loop of the multiple nested loop to an outermost loop thereof. For the aforementioned purpose, in one or more embodiments, the multiple nested loop may require some modification thereto in order to have proper nesting therein. FIG. 6 shows a multiple nested loop 600, according to one or more embodiments. Multiple nested loop 600 may include loops 1-5 therein. Further, loop 3 may be coupled to an external node/loop 6. It can be seen from FIG. 6 that loops 2-3-4 may not be completely nested within loops 1-5.

Figure 7:
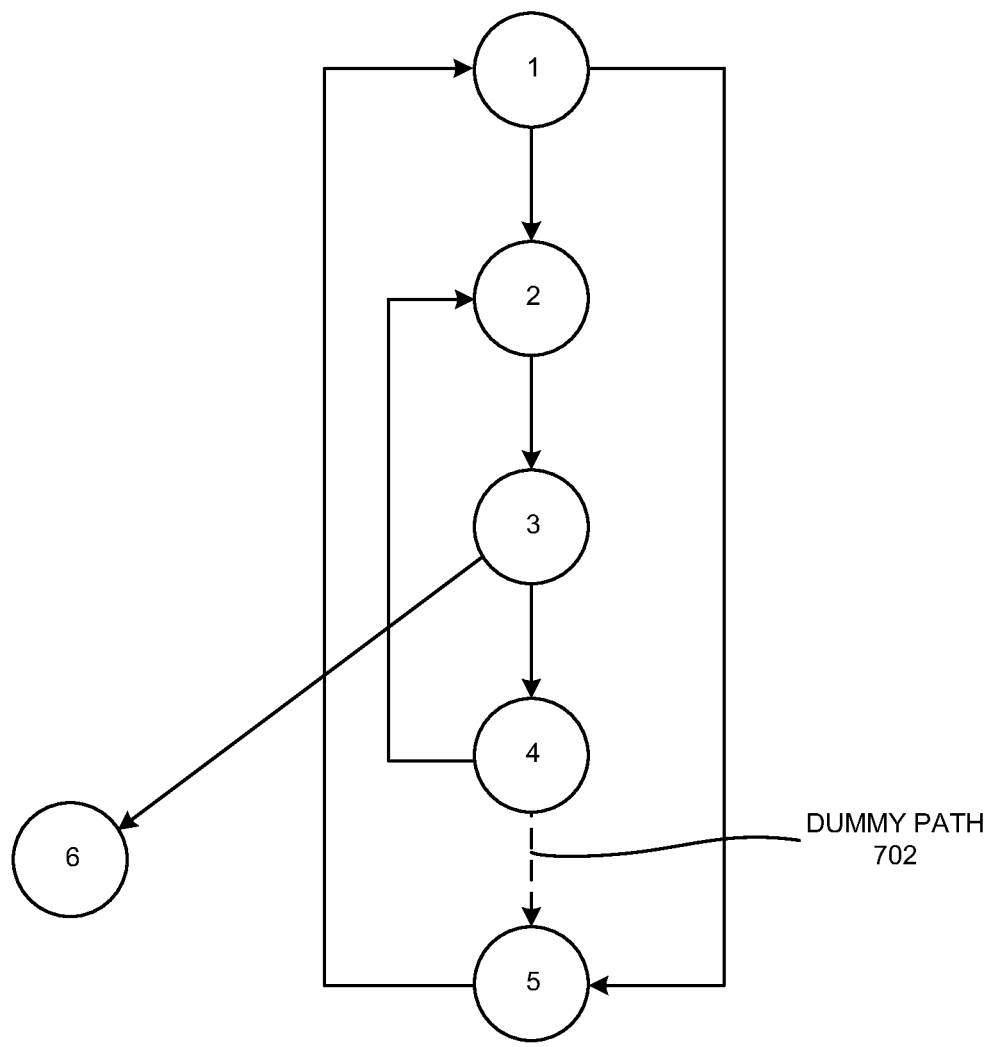
FIG. 7 is a schematic view of completing nesting in the multiple nested loop of FIG. 6, according to one or more embodiments.

FIG. 7 shows completing the nesting in multiple nested loop 600, according to one or more embodiments. Here, a dummy path 702 may be introduced between loop 4 and loop 5 (in other words, loop 4 and an immediately outer loop thereof, viz. loop 5) to complete the missing coupling therebetween. However, dummy path 702 may not be traversed during execution of program code 106, and may solely be utilized to effect the synchronization/optimization discussed above. In one or more embodiments, once fixing of multiple nested loop 600 is done, the constituent loops may be sorted in ascending order based on nesting depths thereof. In one or more embodiments, each constituent loop may be optimized as discussed above in nesting depth order taking into account exit paths (regular paths and runaway paths) therefrom. Also, it should be noted that even if runaway paths are directed from an inner loop to another loop or from the inner loop to outside multiple nested loop 600, optimization may take into account control flows associated with said runaway paths from the inner loop to the another loop or outside multiple nested loop 600 in the nesting depth order. For example, in FIG. 7, control flow associated with the runaway path from loop 3 to loop/node 6 may have to first be redirected to loop 4 and loop 5 in nesting depth order prior to being directed to the originally intended destination. It is obvious then to see that the decision node/ladder may be created at the next nest level. In one or more embodiments, control flow paths out of the decision node/ladder may become exit paths for the next nest level.

Thus, in one or more embodiments, algorithms may be developed for the optimizations/synchronizations discussed above; said algorithms may be part of compiler program 130. Implementations may not be limited to compiler program 130 and the like. For example, data processing device 100 may share a resource (e.g., hardware such as a processor, a memory and a printer) with other data processing devices. There may be a scenario where data processing device 100 may hold exclusive access to the shared resource; this may limit parallel execution on the shared resource. Mapping the aforementioned scenario to a control flow graph (e.g., control flow graph 200, control flow graph 400, a control flow graph including multiple nested loop 600) may necessitate optimization thereof discussed above. Other reasonable variations are within the scope of the exemplary embodiments discussed herein.

It should be noted that instructions associated with the synchronization/optimization discussed above and/or compiler program 130 may be embodied on a non-transitory medium (e.g., Compact Disc (CD), Digital Video Disc (DVD), Blu-ray Disc®, a hard drive) readable through data processing device 100/processor 102 and executable therethrough. Also, it should be noted that the control flow graphs above have been merely discussed for illustrative and conceptual clarification purposes. Other simpler/complex control flow graphs are within the scope of the exemplary embodiments discussed herein. Further, it should be noted that terms such as "pre-header," "post-tail," "dominator," and "post-dominator" are well known to one skilled in the art. Detailed discussion and/or clarification associated therewith have been skipped for the sake of convenience, brevity and clarity.

Still further, it should be noted that exemplary embodiments are amenable to alternate implementations. For example, in the case of TEMP values being utilized to distinguish between regular paths and runaway paths (as in FIGS. 3 and 5), TEMP may be implemented as a temporary assignment node in each runaway path that is now coupled to the decision node discussed above. The appropriate assignment numbers (e.g., 1, 2) may then be injected into the temporary assignment node. Other variations are within the scope of the exemplary embodiments discussed herein.

Figure 8:
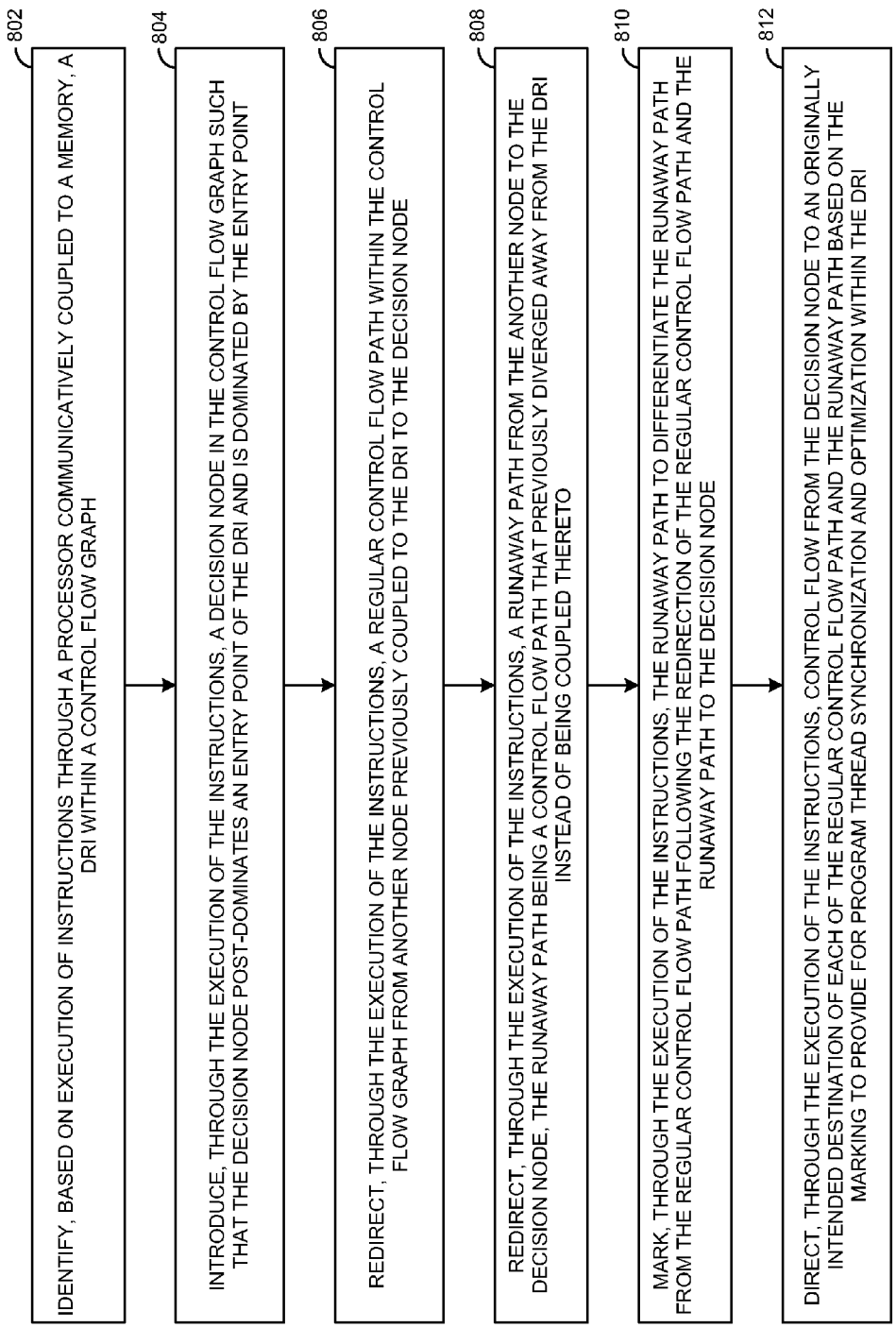
FIG. 8 is a process flow diagram detailing the operations involved in program thread synchronization and optimization within the control flow graph of FIG. 2, according to one or more embodiments.

FIG. 8 shows a process flow diagram detailing the operations involved in program thread synchronization and optimization within control flow graph 200, according to one or more embodiments. In one or more embodiments, operation 802 may involve identifying, based on execution of instructions through processor 102, a DRI (e.g., DRI 204) within control flow graph 200. In one or more embodiments, control flow graph 200 may be a data structure abstracting control flow behavior of executable program code 106. In one or more embodiments, the DRI (e.g., DRI 204) may be a region within control flow graph 200 that does not include a post-dominator node associated therewith. In one or more embodiments, the DRI, when optimized, may provide for reduced runtime of program code 106 compared to the DRI unoptimized.

In one or more embodiments, operation 804 may involve introducing, through the execution of the instructions, DN 302 in control flow graph 200 such that DN 302 post-dominates an entry point of DRI 204 and is dominated by the entry point. In one or more embodiments, operation 806 may involve redirecting, through the execution of the instructions, a regular control flow path within control flow graph 200 from another node previously coupled to DRI 204 to DN 302. In one or more embodiments, operation 808 may involve redirecting, through the execution of the instructions, a runaway path (e.g., runaway path 206) from the another node to DN 302. In one or more embodiments, runaway path 206 may be a control flow path that previously diverged away from DRI 204 instead of being coupled thereto.

In one or more embodiments, operation 810 may involve marking, through the execution of the instructions, runaway path 206 to differentiate runaway path 206 from the regular control flow path following the redirection of the regular control flow path and runaway path 206 to DN 302. In one or more embodiments, operation 812 may then involve directing, through the execution of the instructions, control flow from DN 302 to an originally intended destination of each of the regular control flow path and runaway path 206 based on the marking to provide for program thread synchronization and optimization within DRI 204.

Figure 9:
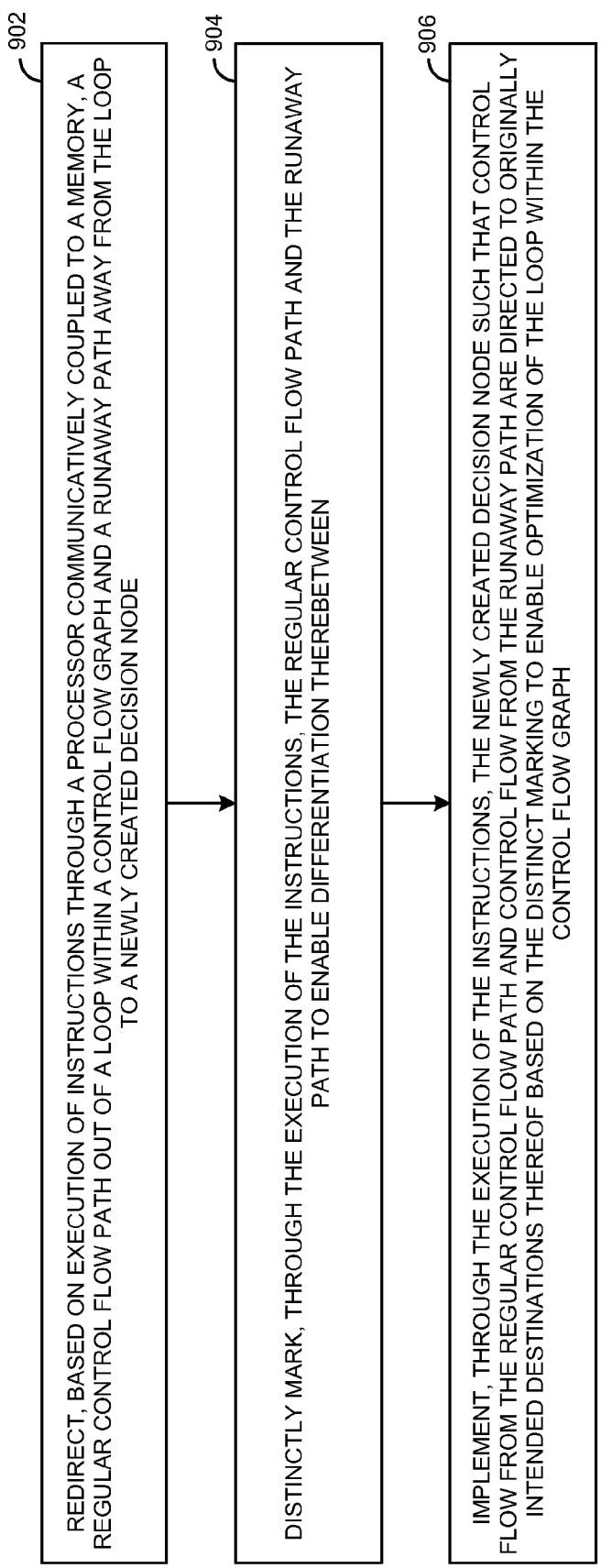
FIG. 9 is a process flow diagram detailing the operations involved in loop optimization within the control flow graph of FIG. 4, according to one or more embodiments.

FIG. 9 shows a process flow diagram detailing the operations involved in loop optimization within control flow graph 400, according to one or more embodiments. In one or more embodiments, operation 902 may involve redirecting, based on execution of instructions through processor 102, a regular control flow path (e.g., regular path 410) out of a loop 402 within control flow graph 400 and a runaway path (e.g., runaway path 404, runaway path 406) away from loop 402 to a newly created DN 502. In one or more embodiments, control flow graph 400 may be a data structure abstracting control flow behavior of executable program code 106. In one or more embodiments, operation 904 may involve distinctly marking, through the execution of the instructions, the regular control flow path and the runaway path to enable differentiation therebetween.

In one or more embodiments, operation 906 may then involve implementing, through the execution of the instructions, the newly created DN 502 such that control flow from the regular control flow path and control flow from the runaway path are directed to originally intended destinations thereof based on the distinct marking to enable optimization of loop 402 within control flow graph 400.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device 100). Accordingly, the specification and drawings are to be regarded in an illustrative rather than a restrictive sense.

What is claimed is:

1. A method comprising:
    identifying, based on execution of instructions through a processor communicatively coupled to a memory, a divergent region of interest (DRI) within a control flow graph, the control flow graph being a data structure abstracting control flow behavior of executable program code, the DRI being a region within the control flow graph not comprising a post-dominator node associated therewith, and the DRI, when optimized, providing for reduced runtime of the executable program code compared to the DRI unoptimized;
    introducing, through the execution of the instructions, a decision node in the control flow graph such that the decision node post-dominates an entry point of the DRI and is dominated by the entry point;

redirecting, through the execution of the instructions, a regular control flow path within the control flow graph from another node previously coupled to the DRI to the decision node;

redirecting, through the execution of the instructions, a runaway path from the another node to the decision node, the runaway path being a control flow path that previously diverged away from the DRI instead of being coupled thereto;

marking, through the execution of the instructions, the runaway path to differentiate the runaway path from the regular control flow path following the redirection of the regular control flow path and the runaway path to the decision node by:
implementing, through the execution of the instructions, a temporary assignment node in the runaway path;
injecting an appropriate assignment number within the temporary assignment node; and
utilizing the assignment number to differentiate between the runaway path and the regular control flow path; and directing, through the execution of the instructions, control flow from the decision node to an originally intended destination of each of the regular control flow path and the runaway path based on the marking to provide for program thread synchronization and optimization within the DRI.

2. The method of claim 1, further comprising identifying the DRI based on a heuristic, the heuristic involving at least one of: static analysis of the executable program code to determine dynamic instruction saving, profiling information and overhead of extraneous instructions associated with the executable program code.

3. The method of claim 1, comprising at least one of:
providing the instructions executing on the processor as part of a compiler program; and
mapping hardware resource sharing in a plurality of data processing devices as the control flow graph.

4. The method of claim 3, comprising implementing the compiler program as part of an application executing on a data processing device comprising the processor.

5. A non-transitory medium, readable through a processor communicatively coupled to a memory and comprising instructions embodied therein that are executable through the processor, comprising:
instructions to identify a DRI within a control flow graph, the control flow graph being a data structure abstracting control flow behavior of executable program code, the DRI being a region within the control flow graph not comprising a post-dominator node associated therewith, and the DRI, when optimized, providing for reduced runtime of the executable program code compared to the DRI unoptimized;
instructions to introduce a decision node in the control flow graph such that the decision node post-dominates an entry point of the DRI and is dominated by the entry point;
instructions to redirect a regular control flow path within the control flow graph from another node previously coupled to the DRI to the decision node;
instructions to redirect a runaway path from the another node to the decision node, the runaway path being a control flow path that previously diverged away from the DRI instead of being coupled thereto;
instructions to mark the runaway path to differentiate the runaway path from the regular control flow path following the redirection of the regular control flow path and the runaway path to the decision node by:
implementing, through the execution of the instructions, a temporary assignment node in the runaway path;
injecting an appropriate assignment number within the temporary assignment node; and
utilizing the assignment number to differentiate between the runaway path and the regular control flow path; and
instructions to direct control flow from the decision node to an originally intended destination of each of the regular control flow path and the runaway path based on the marking to provide for program thread synchronization and optimization within the DRI.

6. The non-transitory medium of claim 5, further comprising instructions to identify the DRI based on a heuristic, the heuristic involving at least one of: static analysis of the executable program code to determine dynamic instruction saving, profiling information and overhead of extraneous instructions associated with the executable program code.

7. The non-transitory medium of claim 5, comprising at least one of:
instructions associated with a compiler program configured to enable the program thread synchronization and optimization at the DRI; and
instructions to map hardware resource sharing in a plurality of data processing devices as the control flow graph.

8. The non-transitory medium of claim 7, comprising instructions to execute the compiler program as part of an application executing on a data processing device comprising the processor.

* * * * *